United States Patent [19]

Reuter et al.

[11] Patent Number: 4,960,023

[45] Date of Patent: Oct. 2, 1990

[54] CROSS-CUT SAWING OF BOARDS BY SAW BLADES MOUNTED ON TRANSVERSELY ADJUSTABLE CARRIERS

[75] Inventors: Alfred Reuter, Oberkirch; Günter Klumpp, Kehl, both of Fed. Rep. of Germany

[73] Assignee: Gebruder Linck Maschinenfabrik "Gatterlinck" GmbH & Co. KG, Oberkirch, Fed. Rep. of Germany

[21] Appl. No.: 294,604

[22] PCT Filed: Jun. 20, 1987

[86] PCT No.: PCT/EP87/00321

§ 371 Date: Dec. 5, 1988

§ 102(e) Date: Dec. 5, 1988

[87] PCT Pub. No.: WO88/00113

PCT Pub. Date: Jan. 14, 1988

[30] Foreign Application Priority Data

Jun. 26, 1986 [DE] Fed. Rep. of Germany ....... 3621357

[51] Int. Cl.$^5$ .......................... B27B 5/22; B27B 31/06
[52] U.S. Cl. ..................................... 83/368; 83/75.5; 83/370; 83/425.4; 83/435.2; 83/508.1; 83/508.3
[58] Field of Search .............. 83/365, 368, 419, 425.2, 83/425.3, 425.4, 435.2, 490, 508.1, 508.3, 564, 75.5, 370

[56] References Cited

U.S. PATENT DOCUMENTS

| | | | |
|---|---|---|---|
| 3,036,605 | 5/1962 | Joa | 83/354 |
| 4,031,790 | 6/1977 | Arvidsson | 83/425.4 |
| 4,468,992 | 9/1984 | McGeehee | 83/368 X |
| 4,541,722 | 9/1985 | Jenks | 356/376 |
| 4,700,758 | 10/1987 | Bernath | 83/365 X |

FOREIGN PATENT DOCUMENTS

| | | |
|---|---|---|
| 0106907 | 5/1984 | European Pat. Off. |
| 2610912 | 8/1984 | Fed. Rep. of Germany |
| 3402497 | 7/1985 | Fed. Rep. of Germany |
| 2528348 | 12/1983 | France |
| 2124144 | 2/1984 | United Kingdom |

Primary Examiner—Hien H. Phan
Attorney, Agent, or Firm—Burns, Doane, Swecker & Mathis

[57] ABSTRACT

A circular cross-cut sawing apparatus comprises two transversely adjustable slides each carrying a plurality of saw blades. The saw blades on each slide can be selectively lowered into the path of oncoming boards. The slides are independently adjustable so that any given board can be cut by blades on both slides.

5 Claims, 2 Drawing Sheets

CROSS-CUT SAWING OF BOARDS BY SAW BLADES MOUNTED ON TRANSVERSELY ADJUSTABLE CARRIERS

BACKGROUND AND OBJECTS OF THE INVENTION

The invention concerns a circular cross-cut saw for the cutting-to-length of boards. A conveyor advances the boards which are arranged transversely to the direction of conveyance. Several circular cross-cut saw units are movable individually toward the path of motion of the transverse conveyor installation and are supported on a saw slide that may be transversely adjusted.

Boards, i.e., elongated wood products, such as planks and deal boards arriving at a saw machine, usually must be cut on both ends to a predetermined length by means of cross-cut saws. Numerous known installations have in common that each board arriving on a transverse conveyor unit is at first moved so that a first end thereof abuts against a stop or the like, and then smooth-cut at the end (DE No. 26 10 912), several cross-cut saw units are located on a common slide, the range of displacement of which then must be only approximately as long as the mutual distance of adjacent cross-cut saw units, so that saw cuts may be carried out selectively within the entire range equipped with cross-cut saw units.

In this manner a significant reduction of the time required for the positioning of the cross-cut saw unit intended to cut the board to a given length is obtained. However, for the cutting of the board first end only a single, stationary cross-cut saw is provided. It is, therefore, necessary there again to run the board initially against a stop before the first end may be cut by that single saw unit. The longitudinal positioning of the board requires a separate longitudinal positioning unit and consumes time.

It is, therefore, an object of the invention to design a cross-cut saw of the afore-mentioned type whereby the time required for the cutting of boards would be substantially reduced and whereby in particular, the need to align the boards transversely before cutting would be eliminated so as to enable the apparatus to be simplified.

SUMMARY OF THE INVENTION

This object is attained according to the invention by orienting cross-cut saw units in two groups on two saw slides, the slides being capable of separate transverse adjustment.

The boards to be cut to a predetermined length need not be positioned against a stop, but rather may be transported in any arbitrary transverse orientation on the conveyor. If prior measurements of the board indicate that saw cuts must be carried out on both ends, the two saw slides are positioned independently of each other so that always one of the saw units located on each slide is in an appropriate position for the cutting of the respective end of the board. The two saw units selected are displaced toward the travel path of the board and cut the board exactly to the predetermined length.

No transverse displacement of the boards on the transverse conveyor installation is required in order to bring a board end into a predetermined relationship with a fixed saw unit. The time required for the cutting operation is, as a result, reduced in accordance with the present invention.

THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
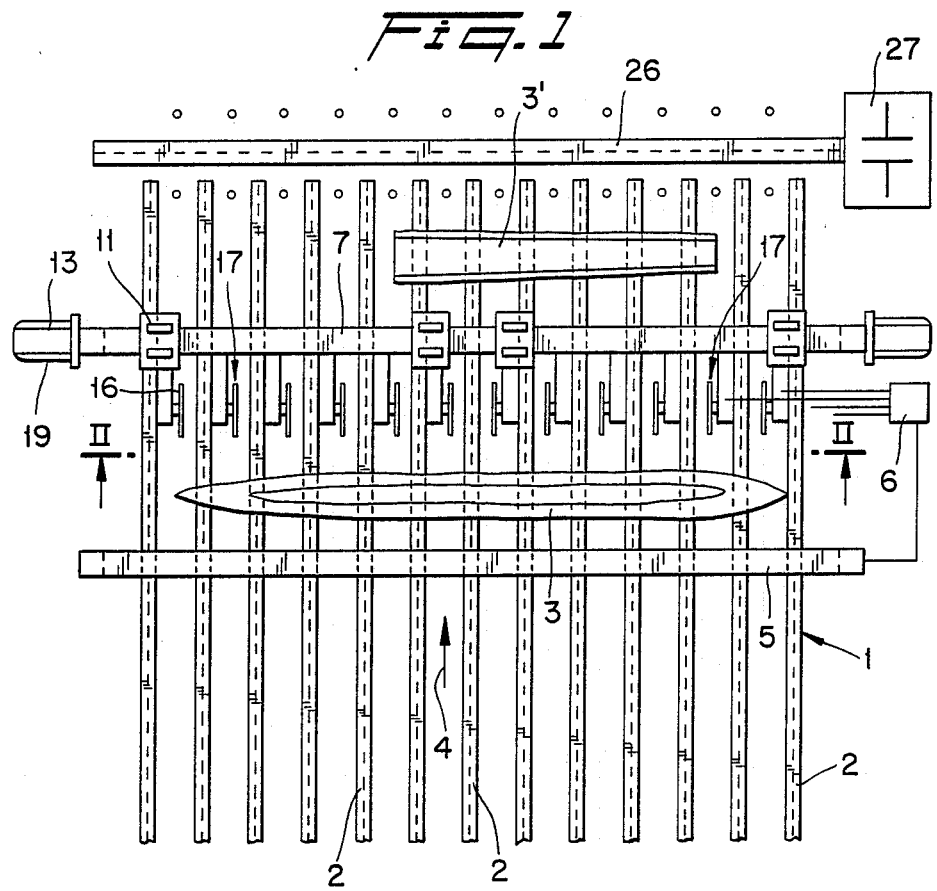
FIG. 1 is a top plan view of a conveyor installation for boards, upon which a circular cross-cut saw for the cutting to length of boards is located.
Figure 2:
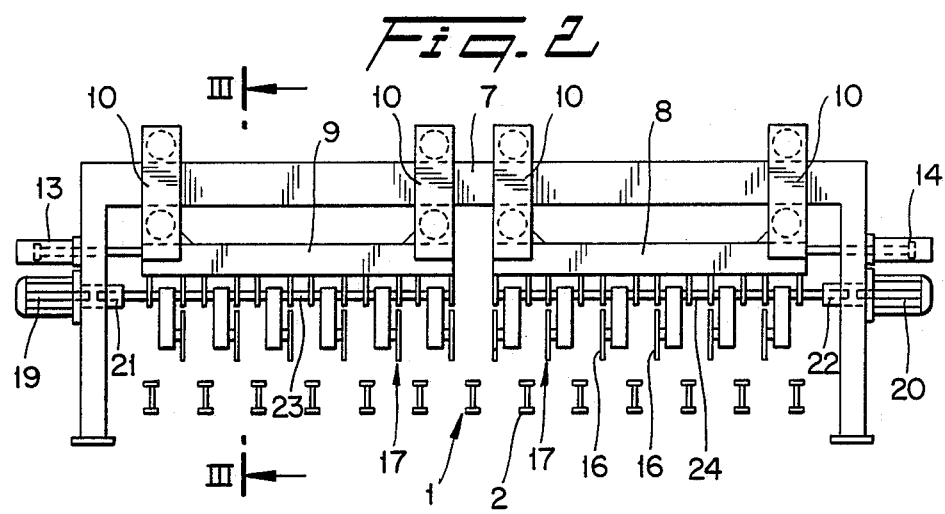
FIG. 2 is a section on the line II—II of FIG. 1.
Figure 3:
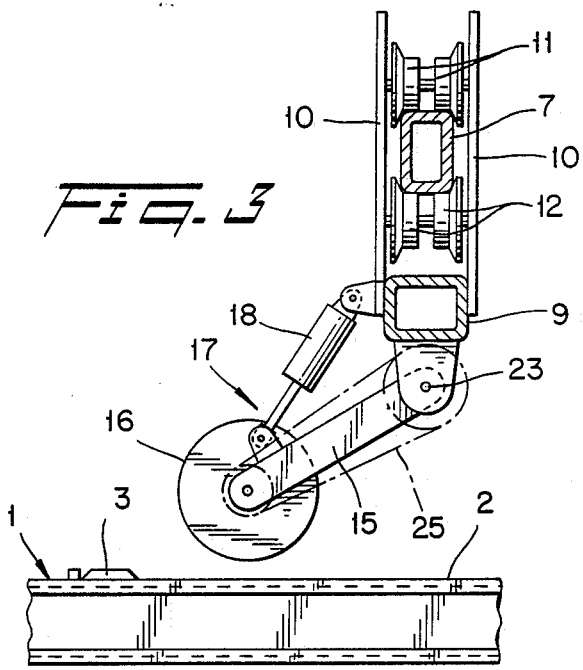
FIG. 3 is an enlarged section on the line III—III of FIG. 2.

The transverse conveyor installation 1 shown in FIGS. 1 to 3 comprises several adjacent conveyor chains 2, spaced apart and parallel to each other. Boards 3 to be cut are transported by upper flights of the chains in the direction of the arrow 4. The boards 3, which may be planks, deal boards or similar elongated wood products, extend transversely to the longitudinal transport direction 4.

In this position, the boards initially pass by a conventional measuring device 5, which extends transversely across the entire width of the conveyor installation and measures the length and width dimensions of the boards 3. From the measuring signals, a conventional control apparatus 6 determines the locations at which two or more dimensioning cuts are to be made. This computing process takes into account both the existing dimensions of the board 3 as measured, and the desired dimensions of the board to be obtained.

On a common guide support 7, extending gantry-like over the entire width of the transverse conveyor installation 1, two saw carriers in the form of slides 8, 9 are located in a transversely displaceable manner. Each of saw slides 8, 9 comprises a horizontal carrier, located under the guide support 7. Each of the saw slides 8, 9 is equipped at both of its ends with two upwardly extending jaws 10, between which a pair of upper guide rolls 11 and a pair of lower guide rolls 12 are rotatably supported (FIG. 3). The guide rolls 11, 12 travel on the top and bottom sides of the guide support 7, whereby guiding the saw blades 8 and 9 along the common guide support 7. Instead of the above-described guide rolls 11, 12, other guiding elements may also be used, for example, linear ball bearings or slide bearing guide bushings supported on round guides.

A pair of positioning drives 13 and 14, each comprising a pressure actuating cylinder, for example, is fastened stationarily to a stand carrying the guide support 7 and is acting on the respective saw slides 8, 9, so that the latter may be displaced to a predetermined location.

Circular saw blades 16 are mounted on the bottom side of each of the saw slides 8, 9 on pivot arms 15 extending obliquely downward. Each of the circular blades 16 forms, together with the associated pivot arm 15, a circular cross-cut saw unit 17. A pivoting drive 18 acting on the saw slides 8 and 9 in the form of a pressure actuated cylinder, for example, is operable to pivot the circular cross-cut saw 16 downward, so that the circular blade 16 moves into the motion path of the board 3 being transported on the transverse conveyor installation 1. The thus-lowered saw units 17 perform the dimensioning cuts, while the other non-lowered saw units 17 remain ineffective.

All of the cross-cut blades 16 of a saw slide 8 or 9 are driven by a common motor 19 or 20, which is mounted stationarily on the stands of the guide support 7 and connected with a drive shaft 23 or 24, by means of a sliding coupling 21 and 22 permitting displacement of the drive shaft along its axis of rotation. The drive shafts 23 and 24 form a common pivot axle for all of the pivot arms 15 of the saw slide 8 or 9. A belt drive 25 connects the drive shafts 23 and 24 with all of the circular saws 16, so that the latter are driven continuously.

The pivoting drives 18 of the individual circular cross-cut saw units 17 and the positioning drives 13 and 14 are controlled by the control apparatus 6. The maximum possible length of the transverse displacement of the saw slides 8 and 9 corresponds approximately to the distance between adjacent circular blades 16, so that the cross-cuts may be carried out at any location, with the small areas of the conveyor chains 22 being exempted. It may be assured in this manner that the lowered circular blades 16 will not engage the conveyor chains 2.

The cut-up board 3' is transferred by the transverse conveyor installation 2 to a longitudinal conveyor 26, which transports the board to a trim saw 27 which trims the longitudinal edges of the board 3'. The values determined by the measuring device 5 may also be used for the width adjustment of the trim saw 5.

Figure 4:
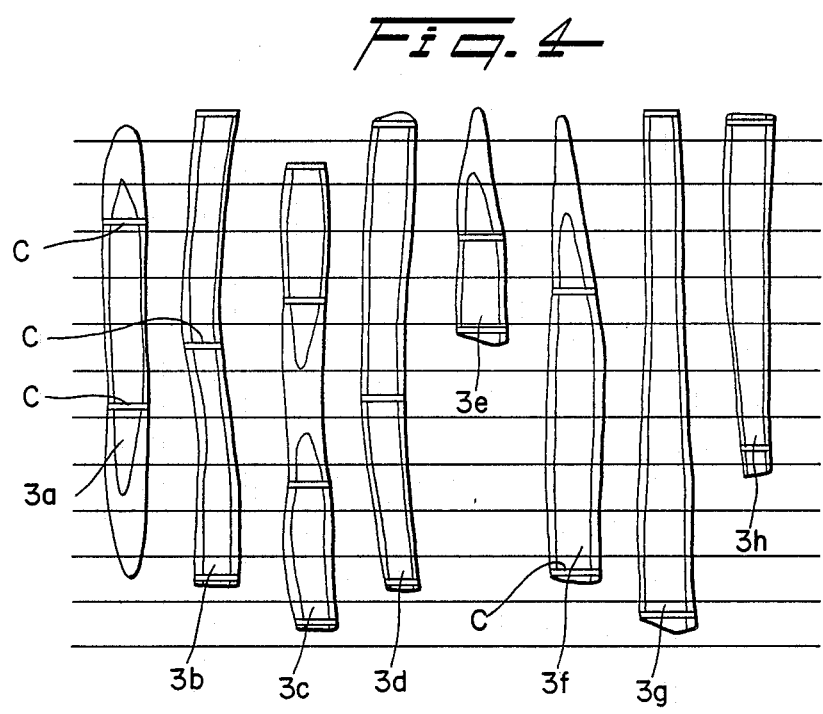
FIG. 4 depicts examples of possible cuts on different boards.

FIG. 4 shows several boards 3a–3h, on which the dimensioning cuts C are carried out by means of a saw according to FIGS. 1–3. A board may be cut into longer sections if the board is of narrow width. The boards 3b, 3c and 3d are chosen as examples on which more than two dimensioning cuts C are performed, because the boards 3b, 3d are curved too much in a certain area, and the board 3c has an excessively narrow center section. The board 3f is an example of a case in which one of the dimensioning cuts is applied close to one end of the board, while the other cut is spaced a substantial distance from the opposite end. The situation is similar relative to board 3e, where however, the usable length is significantly less. The boards 3g and 3h are capped near their ends only to obtain straight board ends.

All of the dimensioning cuts may be carried by the saw described above, without the need for any transverse displacement of the boards against a stop. The slides are independently adjustable such that any given board can, if necessary, be cut by blades on both slides.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. Circular cross-cut sawing apparatus for cutting boards to length, comprising:
    conveyor means for conveyor boards lying transversely of a direction of conveyance,
    first and second saw carriers mounted for separate movement in a direction transversely of said direction of conveyance,
    a plurality of transversely spaced sawing units mounted on each of said first and second saw carriers,
    means for transversely adjusting said first and second saw carriers relative to one another such that at least some of the boards are each cut by saw units of both of said first and second saw carriers,
    first and second motor-driven drive shafts transversely mounted on said first and second saw carriers, respectively,
    said sawing units of said first and second saw carriers including arms pivotably mounted to respective ones of said first and second drive shafts, and rotary saw blades mounted on said arms,
    rotation transmitting means interconnecting said saw blades with respective ones of said drive shafts,
    first and second drive means for continuously rotating said first and second drive shafts, respectively, for continuously rotating said saw blades, and
    means for separately rotating said arms about said drive shafts for adjusting the heights of said saw blades.

2. Apparatus according to claim 1 including a transverse saw guide support, said first and second saw carriers slidably mounted on said support and depending downwardly therefrom.

3. Apparatus according to claim 1 including first and second motors connected to said first and second drive shafts, respectively, for rotating same.

4. Apparatus according to claim 3 including first and second frame means, said first and second motors being mounted on said first and second frame means, respectively, and connected to respective ones of said first and second drive shafts by sliding couplings which permit transverse movement of said drive shafts relative to respective ones of said motors.

5. Apparatus according to claim 1 including a measuring device for measuring the lengths of the boards, said measuring means extending transversely across the entire transverse width of said conveyor means.

* * * * *